United States Patent
Sosman et al.

(10) Patent No.: US 11,415,524 B2
(45) Date of Patent: Aug. 16, 2022

(54) CLASSIFICATION METHOD AND SYSTEM FOR HIGH-THROUGHPUT TRANSPARENT ARTICLES

(71) Applicant: SCHOTT Schweiz AG, St. Gallen (CH)

(72) Inventors: Igor Sosman, St. Gallen (CH);
Christian Kläger, Abtwil (CH);
Dominik Eugster, Oberuzwil (CH);
Stefanie Julia Willmann, St. Gallen (CH)

(73) Assignee: SCHOTT SCHWEIZ AG, St. Gallen (CH)

( * ) Notice: Subject to any disclaimer, the term of this patent is extended or adjusted under 35 U.S.C. 154(b) by 69 days.

(21) Appl. No.: 16/885,417

(22) Filed: May 28, 2020

(65) Prior Publication Data
US 2021/0003512 A1 Jan. 7, 2021

(30) Foreign Application Priority Data
May 28, 2019 (EP) .................................... 19177023

(51) Int. Cl.
*G01N 21/88* (2006.01)
*G06N 20/10* (2019.01)
(Continued)

(52) U.S. Cl.
CPC ....... *G01N 21/8851* (2013.01); *G06K 9/6282* (2013.01); *G06N 20/10* (2019.01); *G06T 7/0004* (2013.01); *G01N 2021/8854* (2013.01)

(58) Field of Classification Search
CPC ....... G01N 21/8851; G01N 2021/8854; G06N 20/10; G06K 9/6282; G06K 2209/19;
(Continued)

(56) References Cited

U.S. PATENT DOCUMENTS 3,613,764 A * 10/1971 Guenard ............. B30B 15/0052
157/1.26
4,256,957 A * 3/1981 Ford .................. G01N 21/8851
209/524
(Continued)

FOREIGN PATENT DOCUMENTS

| CN | 210775277 | * | 6/2020 | ........... G01N 21/958 |
| EP | 0441012 | | 8/1991 | |
| WO | 9618883 | | 6/1996 | |

*Primary Examiner* — Jerome Grant, II
(74) *Attorney, Agent, or Firm* — Ruggiero McAllister & McMahon LLC

(57) ABSTRACT

A method for detecting and classifying defects in high-throughput transparent articles such as syringes, vials, cartridges, ampules, and bottles is provided. The method includes the steps of providing a stream of the articles; capturing a first digital image of each of the articles in the stream; inspecting the first digital image for objects; determining parameters of the objects; performing a first classification step to classify the objects into a first defect class and a second defect class; performing a second classification step to classify the objects into a plurality of defect types using at least two second classification models; comparing at least one object parameter of a classified object with a predetermined defect type dependent threshold; classifying the article as defective or non-defective based on the comparing step; and separating defective articles from non-defective articles.

19 Claims, 2 Drawing Sheets

(51) Int. Cl.
*G06K 9/62* (2022.01)
*G06T 7/00* (2017.01)

(58) Field of Classification Search
CPC ...... G06K 9/00; G06K 9/2018; G06K 9/6227; G06K 9/6281; G06K 9/6269; G06T 7/0004; G06T 2207/10024; G06T 2207/30108; G06T 7/0006; G06T 2207/10016; G06T 2207/20081
USPC .......................................................... 382/141
See application file for complete search history.

(56) References Cited

U.S. PATENT DOCUMENTS

| | | | | |
|---|---|---|---|---|
| 6,130,093 | A * | 10/2000 | Dussault | G01N 21/9018 209/552 |
| 6,809,809 | B2 * | 10/2004 | Kinney | G01N 21/9501 356/237.4 |
| 2004/0154382 | A1 * | 8/2004 | Chevalier, Jr. | G01M 3/36 73/49.3 |
| 2005/0031188 | A1 | 2/2005 | Luu | |
| 2008/0291440 | A1 * | 11/2008 | Sones | G01N 21/9036 356/240.1 |
| 2012/0203101 | A1 * | 8/2012 | Prough | A61B 5/0095 600/424 |
| 2015/0213616 | A1 | 7/2015 | Kappeler | |
| 2016/0109380 | A1 * | 4/2016 | Huibregtse | G05B 23/0235 356/240.1 |
| 2017/0323376 | A1 * | 11/2017 | Glaser | G06Q 20/203 |
| 2018/0232870 | A1 | 8/2018 | Jo | |
| 2019/0392212 | A1 * | 12/2019 | Sawhney | G06K 9/00201 |
| 2020/0050855 | A1 * | 2/2020 | Jabara | G06K 9/4652 |
| 2020/0105009 | A1 * | 4/2020 | Eno | G06T 7/74 |
| 2020/0279373 | A1 * | 9/2020 | Hussain | G16H 50/20 |
| 2020/0394415 | A1 * | 12/2020 | Aoki | G06K 9/3233 |
| 2021/0170451 | A1 * | 6/2021 | Shrout | G06K 9/00664 |

* cited by examiner

CLASSIFICATION METHOD AND SYSTEM FOR HIGH-THROUGHPUT TRANSPARENT ARTICLES

CROSS REFERENCE TO RELATED APPLICATIONS

This application claims benefit under 35 USC § 119 of European Application EP 19177023.9 filed May 28, 2019, the entire contents of which are incorporated herein by reference.

BACKGROUND

1. Field of the Invention

This invention relates to classification methods and systems useful for classifying transparent articles, particularly for classifying articles in a high-throughput process. For example, the classification can be based on optically detectable defects of the articles. The methods and systems are particularly useful for defect detection in pharmaceutical containers.

2. Description of Related Art

Classification systems and methods are as such known in the art. Many of these use machine learning algorithms for training classification models and for inference. There is a vast number of machine learning algorithms and not every algorithm is suitable for every purpose. A very popular and widespread machine learning method is based on artificial neural networks. Machine learning algorithms have gained increased attention because available computing power has increased significantly in recent years. Powerful hardware is needed to utilize machine learning algorithms.

Machine learning algorithms have hitherto not been used for classifying pharmaceutical containers and other transparent articles that are produced in large numbers at high speed ("high-throughput articles"). The reason is that these articles leave the production line at a very high rate that may easily exceed one article per second. It is necessary to classify large numbers of articles within very short time.

Particular problems arise when transparent articles need to be classified. The reason is that optical images of these articles may produce artefacts that make it difficult to differentiate between defect and reflections or other optical phenomena. This problem can be mitigated at least partially by increased training of the respective classification model, using thousands of labeled images of defects as training data. However, many high-throughput transparent articles including pharmaceutical containers are produced at such high quality that only very few defective articles are produced. Thus, it is very difficult to gather sufficient data for training purposes. Further, classification quality must be very high for pharmaceutical products, i.e. the proportion of false negatives (faulty products classified as not defective) must be very low. If classification quality is insufficient, the method will not be approved by the authorities. On the other hand, if the proportion of false positives (flawless products classified as defective) is too high, the method will no longer be economically superior to the conventional method, which is based on camera observation with a fixed set of defects, and selection by comparison of observed objects with all defects of the set.

US 2018/0232870 A1 teaches an inspection system for pharmaceutical containers made of glass or plastic. The system intends to reduce the number of false-positives and false-negatives by classifying the products into three categories: good, not good and user check. Obviously, the system is not fully automated because the underlying algorithm does not provide for sufficient accuracy. The system relies on artificial neural networks for machine learning.

SUMMARY

It is an object of this invention to provide an accurate and reliable method and system for classifying transparent articles, which is suitable for classifying articles within a stream of articles moving at a high speed. In embodiments, the invention allows for the detection of very small defects that are not visible by human eye.

In an embodiment, the invention relates to a method for classification of articles within a stream of moving articles. In another embodiment, the invention relates to a system for classification of articles within a stream of moving articles.

The articles may each have at least one article wall. The article wall may enclose an inner volume of the article (article volume). The article wall may have one or more openings. For example, a vial or bottle typically has one opening and an inner volume enclosed by article walls. A syringe is an article that typically has at least two openings. In embodiments, the article wall has at least two, but less than 10, or less than 5 or less than 3 openings.

The article wall may have an average transmission in the visible wavelength region of at least 60%, or at least 70%, or at least 80%, or at least 90%. The article wall may have a minimum transmission of at least 40%, or at least 60%, or at least 75%, or at least 80% across a wavelength range of at least 150 nm width in the visible wavelength region, such as from 550 nm to 700 nm, or across the whole visible wavelength region. The visible wavelength region may range from 380 nm to 780 nm. It was found that a certain transmission in the visible wavelength region may be useful for classification, if more than one image is captured of a moving device. The articles may undergo rotation during image capturing. For example, an article, such as a vial that rotates about its longitudinal axis while at least two consecutive images are being captured, contains discernible information about both its front and backside walls. The information is discernible because in a rotating article the front wall may—for example—move to the left and the backside may move to the right when comparing first and second images. Thereby, the two walls can be distinguished and more data can be evaluated from two images of a transparent rotating article.

The method may comprise capturing at least a first (and optionally a second) digital image of an article to be classified. First and second images may be captured consecutively, i.e. the second image may be taken after the first image, or vice versa. The time interval between first and second image may be less than 3 seconds, less than 2 seconds or less than 1 second. In an embodiment that includes article rotation, the time interval between two images may be less than it takes the article to perform a complete rotation (360°). Preferably, the time interval will be shorter than it takes the article to perform a half rotation (180°). The time interval between first and second image may be at least 0.001 seconds, or at least 0.01 seconds, or at least 0.1 seconds. If the time interval is too short, it will be difficult to store the image data fast enough and/or the positive effects of article rotation may be reduced. In embodiments, the method includes capturing at least three, at least four, or at least five images of the article. Capturing a video corresponds to capturing a sequence of images. However, in preferred embodiments, the method does not include capturing more than 200 images, preferably not more than 100 images per second, and/or the total number of images captured per article may be limited to up to 100 images, preferably up to 50. Limiting the number of images reduces the hardware requirements needed to perform the method.

First and optional second images, and optionally any further images, may be different in at least one aspect. While the first and second images may contain information about the same individual article, the images may differ in at least one of article position, article orientation, capturing angle and light intensity. Capturing images that differ in at least one of these characteristics helps to identify artefacts in the image data. For example, a reflection that might be interpreted as a scratch in an article wall may not be visible at a different capturing angle or light intensity. A further example is a scratch that might be misinterpreted as an airline in the first image but may be correctly classified using a second image with different article position. This effect is particularly strong in transparent articles because defects are not limited to the wall surfaces (e.g. scratches) but can be inside the wall (e.g. bubbles). Taking at least two pictures of a moving article helps to differentiate between different types of defects. The first and/or second images may have resolutions of at least 1 px/300 µm, at least 1 px/200 µm, at least 1 px/100 µm, or at least 1 px/50 µm. The captured image, or images may include the complete article, or parts of the article. It is an advantage of this invention that excellent classification results may be obtained even with limited resolution. Optionally, a plurality of images may be used to put together a combined image, e.g. a 3D image, of the article. The combined image may then be used in the method of this invention.

The method may include inspecting the digital image, or images, for objects on or in the article wall. An "object" is any optically detectable deviation from the desired glass surface or internal glass structure. Objects may include air bubbles, air lines, scratches, cracks, black marks (e.g. dots), delamination, and/or inclusions. Objects may be very small. For example, objects may be found on or in the article that will not be classified as defect because the object size is below a certain threshold value. Hence, objects include any optically detectable deviation from the desired article properties. Inspecting the image may include determining the position of one of more objects on or in the article wall.

The method may include determining at least one object parameter. Object parameters may include object size, surface area, length, width, height, depth, color, color distribution, circumference, brightness, brightness distribution or combinations thereof. The object parameters are not particularly limited as long as they are optically detectable, i.e. they can be determined using the captured image. The steps of inspecting the image and/or determining object parameters may be done with conventional algorithms, i.e. without using machine learning models. In an embodiment, the image is converted to greyscale. Thresholding may be used to create a binary image for determining object parameters. Using conventional, non-machine-learning algorithms for inspecting the image and/or determining object parameters has the advantage of speed.

The method may include performing a first classification step using a first classification model. The "first" classification model or step is not necessarily used before a second model or step, or trained before a second model is trained. Instead, any reference to a "first" or any further number model is used only for the purpose of distinguishing the models without any indication of sequence. However, in an embodiment, first classification step is performed before the second and any further classification steps.

The first classification model may classify an object into at least one of two or more classes based on one or more features determined from the at least one captured image. The defect classes may comprise a first defect class and a second defect class.

Generally, a useful classification method not only allows for classification of positive and negative articles. A good classification will also provide information relating to the class of defects. Knowledge about defect classes makes it easier to find the cause of the defects. In an embodiment, the first defect class encompasses material-related defects. Material-related defects may include air bubbles, air lines, scratches and cracks. The second defect class may include non-material-related defects. Non-material-related defects may include black marks (e.g. dots), delamination, and inclusions.

The method may include performing a second classification step. The second classification step may comprise using one or more second classification models. In an embodiment, the second classification step uses a set of second classification models, e.g. a specific classification model may be used for a particular type of conceivable defect. The set of second classification models may comprise a plurality of classification models (e.g. at least two), wherein at least one classification model is specific to a first type of possible defect, and at least one classification model is specific to a second type of possible defect. Likewise, the set of second classification models may include at least one classification model specific to a third type of possible defect. In preferred embodiments, each classification model within the set of second classification models is specific to a particular type of possible defect. It was found that using classification models in the second classification step that are specific to a certain type of possible defect increases classification quality as every model is trained with respect to a particular type of possible defect. Classifying the types of possible defects helps to understand the origin of the respective defect. Examples of defect types are air bubbles, air lines, scratches, cracks, black marks (e.g. dots), delamination, and inclusions.

The two-step classification method described herein has a number of advantages. The first classification step performs a pre-classification that classifies the objects according to the defect class, i.e. non-material related defects and material-related defects. This first classification step can be performed very fast as it does not need to classify the objects into detailed groups of defect types. The objects are pre-classified into two distinct defect classes. The specific type of defect will only be classified in the second classification step. The second classification step can be performed with excellent accuracy because the objects have already been pre-classified in the first step.

After classification of the objects according to defect types, the classified objects are evaluated in order to determine whether they constitute relevant defects that lead to separation of the article on which they were detected. The method may include the step of comparing at least one object parameter of a classified object with a predetermined defect type dependent threshold. For example, an object may have been classified as a scratch. A predetermined threshold relating to scratches may be a scratch length of 3 mm and a scratch width of 0.3 mm. If the scratch exceeds the threshold, the article that carries the scratch will be classified as defective. If an article does not contain a single classified object exceeding the defect type dependent threshold, the article will be classified as non-defective. The method may include the step of classifying the article as defective or non-defective based on the comparison. Defective articles may be separated from non-defective articles. Applying the predetermined threshold as described has the advantage that the thresholds can be set specifically for each defect. For example, an allowed object length may be higher for one defect and lower for another defect. If a particular threshold was used for the objects irrespective of defect type, more articles would be classified as defective.

The method is suitable for classifying a large number of articles within a short time. For example, the stream of articles may comprise at least 30 articles per minute. The articles may be classified with high speed while traveling on a conveying device. In other embodiments, the stream of articles may comprise at least 40, at least 50, or at least 60 articles per minute. The method may even be used for article streams that comprise more than one article per second.

The method is suitable for classifying essentially all of the articles within the stream of articles. In embodiments, at least 95% of the articles within the article stream are classified. Preferably, at least 97%, at least 99% or at least 99.5% are classified. Preferably, essentially all of the articles are classified.

It was found that at least the first classification model should be a deterministic model. A deterministic classification model allows for the classification speed needed to classify high-throughput transparent articles. On the other hand, probabilistic classification models, such as non-deterministic artificial neural networks, tend to require much more time and computational resources for classification. It was found that non-deterministic approaches are not feasible when great numbers of articles must be classified within short time. In embodiments, at least one, and preferably all of the classification models in the set of second classification models are deterministic models.

The method may further include the step of physically separating the non-defective articles from defective articles. In this description, "defective article" refers to an article that was classified as having a threshold-exceeding defect during the first and/or second classification step. The articles may be separated using a conveyor with covered holes, wherein the cover is removed from the hole, if an article is to be separated so that the article falls into the hole. Alternatively, articles can be blown off the conveyor using pressurized air, or pushed from the conveyor using a pusher. Further, a grabber or robot arm could grab the article to be separated.

In an embodiment, the invention relates to a system for the classification of articles within a stream of moving articles. The system may be directly attached to an article production or processing line.

The system may comprise at least one conveying device for conveying articles. The conveying device may be a conveyor belt, a transport tray or cart, a slide, a robot arm, or any other type of conveying device. The conveying device, or plurality of conveying devices, must be capable of conveying a large number of articles per minute. Articles may be transported in a standing position, or lying down. Articles may rotate, or otherwise change their orientation. Rotation may be accomplished by the conveying device, e.g. articles rolling down a slide, or rotation may be done using a manipulator, such as a robot arm.

The system comprises at least one image capturing device capable of capturing at least a first and optionally a second image of an article within a stream of articles comprising at least 30 articles per minute. The stream of articles may comprise at least 40, at least 50, or at least 60 articles per minute. The image capturing device may comprise one or more cameras. The cameras may be disposed in different parts of the system, e.g. taking pictures of the articles from different angles so as to gather the most relevant information about the articles in the article stream.

The system comprises at least one piece of computer hardware configured to perform at least the first and/or the second classification step. The same hardware may be used for inspecting the digital image, determining object parameters, comparing object parameters with threshold values and/or classifying the articles. The computer hardware may comprise a CPU. The CPU may function as both an arithmetic processing unit and a control unit and controls an entire operation of the system or a part of an operation of the system, according to the programs recorded in a ROM, RAM, a storage device, or a removable medium. The ROM may store programs and arithmetic parameters used by the CPU, and the RAM may primarily store programs used to run the execution of the CPU and various parameters changing as appropriate during the execution. The CPU, the ROM, and the RAM may be connected to each other via a host bus, configured from an internal bus such as a CPU bus or variants of it. In addition, the host bus may be connected to the external bus such as a peripheral component interconnect/interface (PCI) bus via the bridge.

A user may operate on the input device by a mouse, keyboard, a touch panel, buttons, a switch or the like. For example, a user may input defect type dependent thresholds. The system may comprise an output device. The output device may be a device which visually displays necessary information according to users wishes, e.g. a display device such as a liquid crystal display (LCD), a plasma display panel (PDP), or an electro-luminescence (EL) display. The storage device may be a device for storing data of the information processing apparatus, e.g. programs executed by the CPU. The system may comprise a connection port for allowing devices to connect directly to the system, e.g., a universal serial bus (USB) port or a high-definition multimedia interface (HDMI) port or the like. The connection of an optional external connection device to the connection port enables the exchange of data and/or programs between the information processing apparatus and the external connection device. An optional communication device is a device for creating communication to a communication network, e.g., the device such as a wired or wireless local area network (LAN), Bluetooth (registered trademark) communicates through a network such as the internet. Thus, the method of this invention can be implemented on a subset of different systems.

The system may comprise at least one separator capable of separating articles based on their classifications. The articles may be separated using a conveyor with covered holes, wherein the cover is removed from the hole, if an article is to be separated so that the article falls into the hole. Alternatively, the system may comprise a nozzle for blowing articles off the conveyor using pressurized air, or a pusher for pushing articles from the conveyor. Further, a grabber or robot arm could be included to grab the articles to be separated.

The invention also relates to using the method and/or the system for classifying articles, such as pharmaceutical containers or other articles described herein.

Capturing the first and/or second image may comprise storing meta information relating to the captured image. The meta information may be selected from article position, article orientation, capturing angle, light intensity, camera information, aperture, article movement speed, article rotation speed, type of article and combinations thereof. Meta information may increase classification accuracy. The captured image may be stored in a data storage for further processing. Capturing the first and/or second image may comprise illuminating the article with light within the visible wavelength region.

During image capturing the article should preferably be empty. In other words, the article volume should preferably not contain any liquid or solid material. The article volume may be filled with air. It was found that classification is more accurate, if the article is empty. The reason might be that any liquid material within the article volume causes optical effects that disturb defect detection by causing artefacts. Also, the additional image information that can be extracted from the captured image relating to the backside wall of the article may not, or not fully be available, if the article is not empty. Of course, filled articles can also be classified using this method and system, however the inventors believe that more training data would be necessary to achieve the same results as with empty articles.

The method and system is suitable for classification of articles according to the presence of defects on or in the article, such as on or in the article wall. The defects may be grouped into classes and types. Defect classes may include material-related and non-material-related defects. Defect types may include air bubbles, air lines, scratches, cracks, black dots, delamination, and inclusions. In an embodiment, the method classifies the articles according to defect class in a first classification step followed by a second classification step that classifies the articles according to defect type.

Material-related defects may include air bubbles, air lines, scratches and cracks. Non-material-related defects may include black marks (e.g. dots), delamination, and inclusions. These defect classes are chosen for pre-classification. Material related defects may be described as generally three dimensional objects, whereas non-material related defects can be described as generally two dimensional. Using these criteria for pre-classification improves classification accuracy in the second classification step because the defects within a defect class have relevant classification criteria in common.

In an aspect of this invention the method and system is capable of detecting defects having sizes of less than 100 μm. "Size" means the defects largest diameter.

The first classification model and/or one or more of the models of the set of second classification models may be trained using machine learning.

The first classification model and/or one or more of the models of the set of second classification models are trained using at least one machine learning algorithm. The algorithm may be selected from Support Vector Machines (SVM), Naïve Bayes, Decision Tree, Random Forest, (Shallow) Neural Network and combinations thereof. A "shallow" neural network is an artificial neural network with less than three, or less than two hidden layers.

The first classification model and/or one or more of the models of the set of second classification models may remain unchanged during productive use of the method. "Productive use" means that the method or system is applied to articles intended for sale. In other words, training of the models does not continue during productive use of the method or system at least in certain embodiments. The reason is that the accuracy of the classification should not change during use of method or system. If training was continued during productive use, the model would be changed by training it. Changing the model by training is not always improving its accuracy. For example, overfitting may occur. Changing the classification method or system may be prohibited by law, particularly when pharmaceutical containers are concerned. This aspect makes it even more relevant to use a model that can be trained with very limited training data. However, in an embodiment, images captured and other information collected during productive use may be used to train the first classification model and/or one or more of the models of the set of second classification models for use as an update or improved version. The improved version of the models could then be used in another production run after approval.

The articles may be containers such as pharmaceutical containers. Suitable articles include but are not limited to syringes, tubes, vials, cartridges, ampules, and bottles. While the method and system of this invention may be used for any type of article, it is particularly useful and it was developed for transparent articles produced at a high production rate. The articles may be coated or uncoated. In embodiments, the articles, e.g. the article walls, may be coated with a coating. The coating may be selected such that the transparency of the article does not fall below the values disclosed herein. The articles may be made of glass, plastic or a combination thereof. Preferably, the articles, and/or article walls, have a refractive index $n_d$ of less than 1.6, or even less than 1.5. If the refractive index is very high, reflections at the article walls will increase which may affect accuracy.

The glass may be selected from soda-lime, borosilicate, or alumosilicate. The plastic may be selected from COC (cyclic olefin copolymer), COP (cyclic olefin polymer) and PET (polyethylene terephthalate).

The article walls may have thicknesses of at least 0.5 mm, at least 1 mm, at least 1.5 mm, or at least 2 mm. The wall thicknesses may be limited to a maximum of 5 mm, 4 mm or 3 mm. For example, the wall thickness may range from 0.5 to 5 mm, or from 1 mm to 4 mm. Wall thicknesses within the defined ranges keep undesired optical effects at an acceptable level and allow for sufficient transparency.

The articles may be large or small. The inner volume of the articles is not particularly limited. In an embodiment, the articles have an inner volume of from 1 ml to 5,000 ml. In embodiments, the upper limit of the volume may be 2,500 ml, 1,000 ml or 250 ml. Articles, such as pharmaceutical containers that are produced at high speeds, are usually not very large, e.g. up to 100 ml.

In an embodiment, the articles rotate at least during image capturing. The articles may rotate about their longitudinal axes. For example, the articles may be transported on a conveying device such as a conveyor belt. The articles may be transported in an upright position, or lying down.

DETAILED DESCRIPTION

Figure 1:
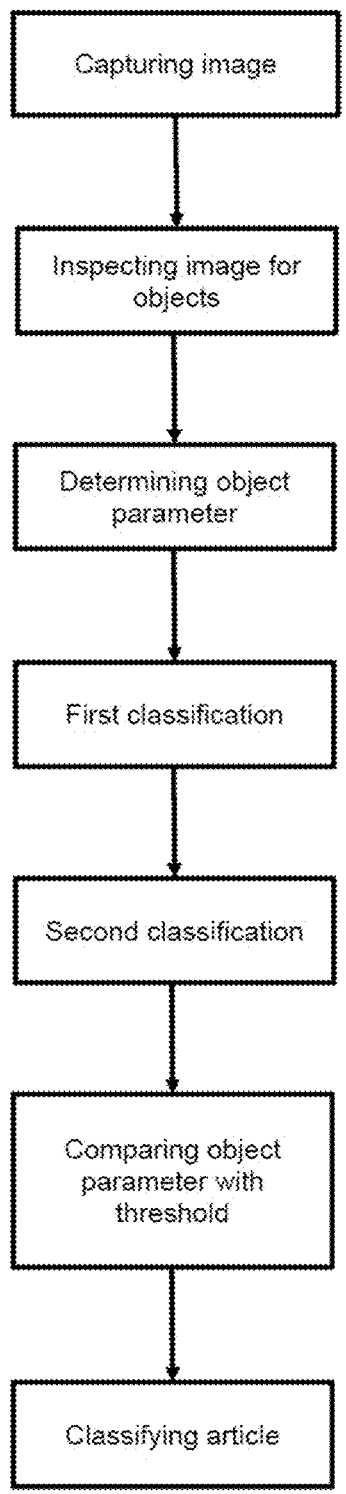
FIG. 1 shows a classification roadmap illustrating the classification of articles according to the method of this invention.

FIG. 1 shows a classification roadmap according to an exemplary embodiment of the method of this invention. In a first step, at least one image is captured. Particularly, a plurality of images may be captured. The images may be put together to form a larger image that carries more information, e.g. a 3D image. A camera may be used for image capturing. The camera may capture the image while the article passes the camera on a conveying device. Alternatively, the article may be grabbed by a manipulator, and presented to the camera. The angle at which the article is presented to the camera may be stored as meta information of the image.

After capturing the image, the image may be inspected for objects. Generally, there is no article completely free of objects. Image inspection may include using software, e.g. conventional algorithms converting the digital image into a binary image. Objects can be found by evaluating optical differences, e.g. from grayscale information, in the surface or internal structure of the article.

Afterwards, object parameters may be determined. For example, a length or width of an object may be determined. Preferably, a plurality of object parameters will be determined. The determination of object parameters may include extracting features from the image, such as extracting various image attributes, e.g. as described in US 2005/0031188 A1.

The determined object parameters may then be used to perform the first and/or second classification step. In the first classification step, the objects are classified into defect classes, whereas the second classification step classifies objects according to defect types. Preferably, first and second classification steps utilize deterministic machine learning models, e.g. support vector machines. The object parameters can be used input data for the classifier. As a result of the second classification step, each object will be classified according to its predicted defect type.

The method may include a plurality of threshold values relating to each defect type. The object parameters may now be compared with the thresholds relevant for the specific defect. If an article comprises at least one object that exceeds the relevant threshold values, the article will be classified as defective. In the alternative, the article will be classified as non-defective.

Figure 2:
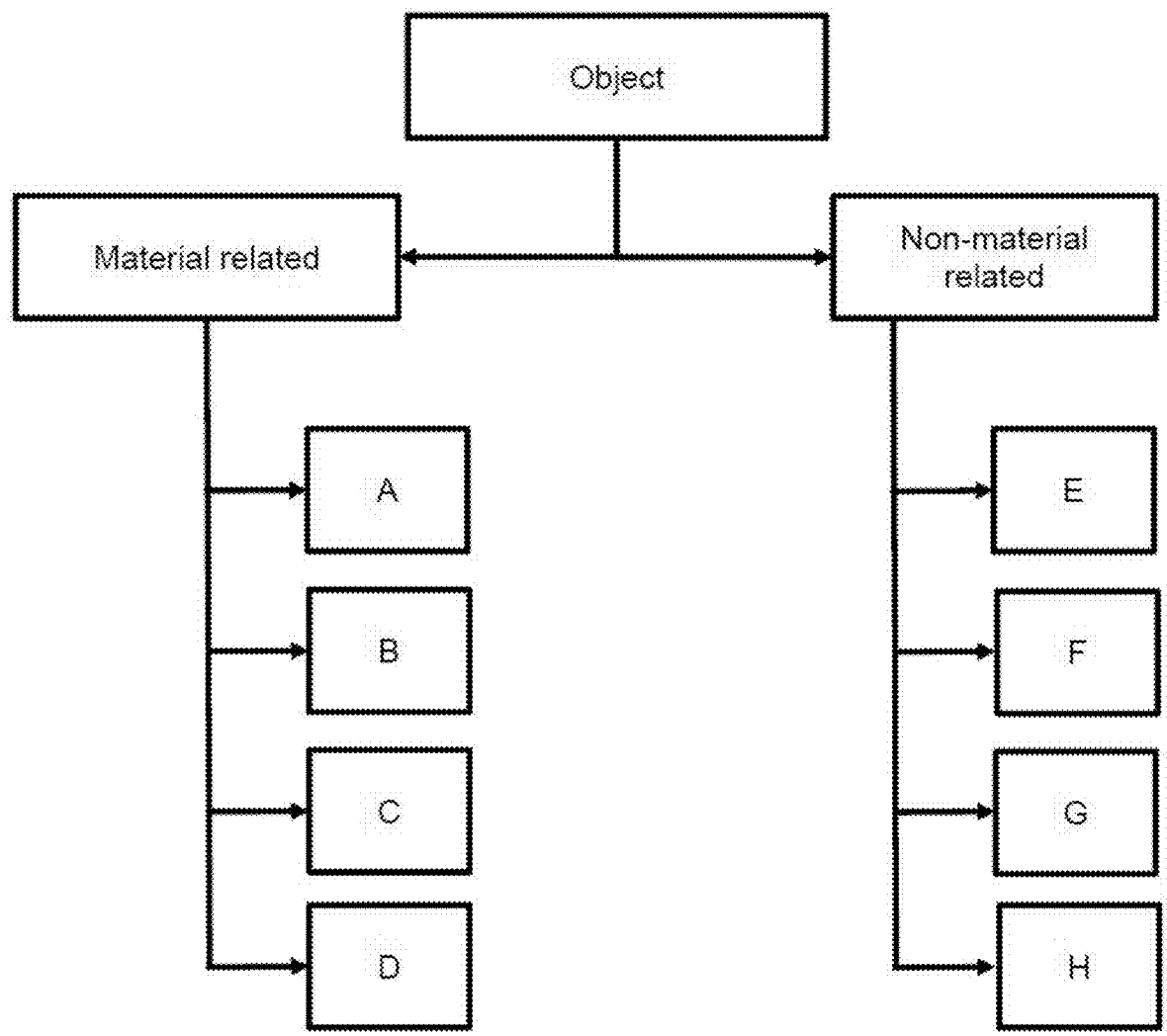
FIG. 2 illustrates the two-step classification of objects according to defect class and defect type.

FIG. 2 illustrates the two-step machine learning classification method of this invention. As a result of inspection for objects and determination of object parameters, the object parameters can be used as input data for a classification model. According to this invention the first classification model classifies the object into defect classes, material related defects and non-material related defects. The advantage of this two-step process is that the machine-learning classifiers in the second classification step can be more accurate even when training data is scarce. Classification into defect types (A-D, and E-H) is possible with a very fast algorithm.

EXPERIMENTS

In this example, a Support Vector Machine was used as the machine learning algorithm. Glass vials were inspected for objects. The stream of glass vials comprised 70 articles/minute. In a first experiment a single classification step was applied, i.e. a classification model was trained to distinguish between four different types of defects (Defects 1-4). In a second experiment, a two-step classification process was applied for defect detection, wherein a first classification step classified the objects into material-related and non-material related defects, respectively. In a second classification step the objects were further classified into one of the specific defect types 1-4. TABLE 1 below shows the classification accuracy.

TABLE 1

| Example | Defect 1 | Defect 2 | Defect 3 | Defect 4 |
|---------|----------|----------|----------|----------|
| 1 | 94% | 79% | 2% | 56% |
| 2 | 86% | 100% | 96% | 79% |

The example shows that the two-step classification yields far better results than a one-step classification.

The invention claimed is:

1. A method for the classification of articles, comprising:
providing a stream of the articles of at least 30 articles per minute;
capturing a first digital image of each of the articles in the stream, the articles having a wall enclosing a volume, the wall having a minimum transmission of at least 40% across a wavelength range of at least 150 nm width in the visible wavelength region;
inspecting the first digital image for objects on or in the wall of each of the articles;
determining one or more parameters of the objects from the first digital image;
performing a first classification step to classify the objects into a first defect class and a second defect class based on the one or more parameters using a first classification model, wherein the first classification model is a deterministic model;
performing a second classification step to classify the objects into a plurality of defect types using at least two second classification models;
comparing at least one object parameter of a classified object with a predetermined defect type dependent threshold;
classifying the article as defective or non-defective based on the comparing step, wherein at least 95% of the articles within the stream are classified; and
separating defective articles from non-defective articles, wherein the first classification model and/or one or more of the two second classification models are machine learning models.

2. The method of claim 1, wherein the capturing step further comprises capturing a second digital image of each of the articles in the stream, wherein the first and second digital images differ from one another in an attribute selected from a group consisting of a position of the article, an orientation of the article, a capturing angle, a light intensity, and any combinations thereof.

3. The method of claim 1, wherein the step of determining the one or more parameters of the objects comprises determining a parameter selected from a group consisting of a position of the object, a size of the object, a surface area of the object, a length of the object, a width of the object, a height of the object, a depth of the object, a color of the object, a color distribution of the object, a circumference of the object, a brightness of the object, a brightness distribution of the object, and any combinations thereof.

4. The method of claim 1, wherein the two second classification models comprise one model specific to a first defect type and another model specific to a second defect type.

5. The method of claim 1, wherein the capturing step further comprises storing meta information related to the first digital image.

6. The method of claim 5, wherein the meta information is selected from a group consisting of an article position, an article orientation, a capturing angle, a light intensity, camera information, a camera aperture, an article movement speed, an article rotation speed, an article type, and any combinations thereof.

7. The method of claim 1, wherein the volume does not contain any liquid and/or solid material.

8. The method of claim 1, wherein at least one of the two second classification models are deterministic models.

9. The method of claim 1, wherein the two second classification models are deterministic models.

10. The method of claim 1, wherein the machine learning models are selected from a group consisting of Support Vector Machines (SVM), Naïve Bayes, Decision Tree, Random Forest, (Shallow) Neural Network, and any combinations thereof.

11. The method of claim 1, wherein the first classification model and/or one or more of the two second classification models remain unchanged.

12. The method of claim 1, wherein the first and send defect classes comprise material-related defects and non-material related defects.

13. The method of claim 1, wherein the step of providing the stream of the articles comprises providing at least 50 articles per minute.

14. The method of claim 1, wherein at least 99% of the articles within the article stream are classified.

15. The method of claim 1, wherein the articles are containers selected from a group consisting of a pharmaceutical container, a syringe, a vial, a cartridge, an ampule, and a bottle.

16. The method of claim 1, wherein the articles are made of glass, plastic or a combination thereof.

17. The method of claim 1, wherein the articles, and/or article walls, have a refractive index $n_d$ of less than 1.6.

18. A system for classification of articles, comprising:
a conveying device configured to conveying the articles in a stream of at least at least 30 articles per minute, the articles having a wall enclosing a volume, the wall having a minimum transmission of at least 40% across a wavelength range of at least 150 nm width in the visible wavelength region;
an image capturing device;
a separator configured to separating articles from the stream; and
computer hardware in communication with the image capturing device and the separator, wherein the computer hardware is configured and programmed to perform at least the following steps:
controlling the image capturing device to capture a first digital image of each of the articles in the stream,
inspecting the first digital image for objects on or in the wall,
determining one or more parameters of the objects from the first digital image;
performing a first classification step to classify the objects into a first defect class and a second defect class based on the one or more parameters using a first classification model, wherein the first classification model is a deterministic model;
performing a second classification step to classify the objects into a plurality of defect types using at least two second classification models;
comparing at least one object parameter of a classified object with a predetermined defect type dependent threshold,
classifying the article as defective or non-defective based on the comparing step, wherein at least 95% of the articles within the stream are classified; and
controlling the separator to separate the articles classified as defective articles from articles classified as non-defective, wherein the first classification model and/or one or more of the two second classification models are machine learning models.

19. The system of claim 18, wherein the image capturing device comprises one or more cameras.

* * * * *